US012763668B2

(12) United States Patent
Chen et al.

(10) Patent No.: US 12,763,668 B2
(45) Date of Patent: Oct. 13, 2026

(54) ISOLATED CONVERTER WITH OUTPUT VOLTAGE PROTECTION AND ADJUSTABLE PROTECTION THRESHOLD

(71) Applicant: CHICONY POWER TECHNOLOGY CO., LTD., New Taipei City (TW)

(72) Inventors: Kuo-Yang Chen, New Taipei City (TW); Chi-Tsung Wu, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 254 days.

(21) Appl. No.: 18/646,195

(22) Filed: Apr. 25, 2024

(65) Prior Publication Data

US 2025/0183787 A1 Jun. 5, 2025

(30) Foreign Application Priority Data

Nov. 30, 2023 (TW) ................................ 112146613

(51) Int. Cl.
*H02M 3/335* (2006.01)
*H02M 1/00* (2006.01)
*H02M 1/32* (2007.01)

(52) U.S. Cl.
CPC ........... *H02M 1/32* (2013.01); *H02M 1/0032* (2021.05); *H02M 3/33507* (2013.01); *H02M 3/33523* (2013.01)

(58) Field of Classification Search
CPC ............................................... H02M 3/335–42
See application file for complete search history.

(56) References Cited

U.S. PATENT DOCUMENTS

2007/0236962 A1* 10/2007 Minkkinen ............. H02M 1/32 363/16
2017/0353113 A1 12/2017 Ono

FOREIGN PATENT DOCUMENTS

CN 101119162 A 2/2008
CN 103326577 A 9/2013
CN 103384117 A 11/2013
CN 203827205 U 9/2014
CN 104953837 A 9/2015
(Continued)

OTHER PUBLICATIONS

Office Action dated May 3, 2024 of the corresponding Taiwan patent application No. 112146613.

*Primary Examiner* — Peter M Novak
(74) *Attorney, Agent, or Firm* — MUNCY, GEISSLER, OLDS & LOWE, P.C.

(57) ABSTRACT

A power supply unit provides an output voltage to supply power to a load. The power supply unit includes an over-power protection circuit, and the over-power protection circuit includes a switch, a first resistor and a second resistor. When the output voltage is at a first level, the over-power protection circuit turns on the switch according to the output voltage at the first level to provide a first resistance value based on the first resistor and the second resistor in parallel, so as to adjust the over-power protection value of the power converter to a first value. When the output voltage is at the second level, the over-power protection circuit turns off the switch according to the output voltage at the second level to provide a second resistance value of the second resistor, so as to adjust the over-power protection value to a second value.

4 Claims, 8 Drawing Sheets

(56) References Cited

FOREIGN PATENT DOCUMENTS

| | | | |
|---|---|---|---|
| CN | 217240311 | U | 8/2022 |
| TW | 201206034 | A | 2/2012 |
| TW | 201249079 | A | 12/2012 |
| TW | 201314937 | A | 4/2013 |
| TW | 201320567 | A | 5/2013 |
| TW | 201537877 | A | 10/2015 |
| TW | 201614919 | A | 4/2016 |

* cited by examiner

ISOLATED CONVERTER WITH OUTPUT VOLTAGE PROTECTION AND ADJUSTABLE PROTECTION THRESHOLD

CROSS REFERENCE TO RELATED APPLICATIONS

This patent application claims priority to Taiwan Patent Application No. 112146613 filed Nov. 30, 2023, now Taiwan patent no. TWI874017 issued on Feb. 21, 2025, which is incorporated by reference herein.

BACKGROUND

Technical Field

The present disclosure relates to a power supply unit and an operation method for the same, and more particularly to the power supply unit and an adjustment method for an over-power protection value thereof.

Description of Related Art

In recent years, the problem of global climate change is becoming increasingly serious, and carbon emissions in particular have attracted widespread attention. In order to reduce the negative impact on the environment, energy conservation has become a key issue. In this case, limitations on power losses of a power supply unit powering an electronic product have also become further stringent.

Wherein, the power supply unit generally adjusts its operating state according to the needs of the back-end coupled load, which may be divided into a normal operating state and a standby state. Taking the back-end load as a printer as an example, the printer is in the standby state most of the time, and it will continue to consume power in the standby state. Therefore, in recent years, the requirements for a power consumption for the electronic product during standby are becoming increasingly stringent. In order to ensure that the power supply unit consumes as little power as possible in a standby mode, the system usually provides one or more sets of driving signals to instruct the power supply unit to adjust an output voltage to a minimum voltage required by the system in the standby mode or a sleep mode. When the power supply unit adjusts the output voltage, it may also significantly reduce an operating voltage and an operation frequency of a controller inside the power supply unit, so as to reduce the power consumption of the controller and an energy loss of a switching element.

However, in the power supply unit of the prior art, after the output voltage is reduced, an over-power protection value cannot be adjusted at the same time, and the issue of the over-power protection failure will inevitably occur. For example, when the power supply unit operates in normal operating mode, its output voltage is 24V. At this time, if a maximum value of an output current is set to 4 A, the over-power protection value is 96 W, and when the output current exceeds this value, the power supply unit will perform over-power protection function. However, under the same conditions and the power supply unit operates in the standby mode, the output voltage is 5V. At this time, if the over-power protection value is not adjusted accordingly, and under the condition that the output voltage is 5V, the output current triggering over-power protection function will be as high as 19.2 A. In this way, the system as all is bound to withstand such a high current and is prone to risks such as system overheating, burning of internal electronic components, and even burning.

Therefore, it is a major topic for the inventors of the present disclosure to design a power supply unit and an adjustment method for an over-power protection value thereof to correspondingly adjust the over-power protection value under different levels of output voltage to comply with relevant specifications of LPS (Limited Power Source).

SUMMARY

In order to solve the above-mentioned problems, the present disclosure provides a power supply unit. The power supply unit configured to provide an output voltage from an output end to supply power to a load, and the power supply unit includes an over-power protection circuit, and the over-power protection circuit includes a switch, a first resistor and a second resistor. The switch includes a first end and a second end, the first end is coupled to a power switch and a controller of the power supply unit, and the controller is configured to set an over-power protection value of the power supply unit according to a voltage of the first end. One end of the first resistor is coupled to the second end. One end of the second resistor is coupled to the first end, and the other end of the second resistor is coupled to the other end of the first resistor. Wherein, when the output voltage is at a first level, the over-power protection circuit is configured to turn on the switch according to the output voltage with the first level to provide a first resistance value based on the first resistor and the second resistor in parallel, so as to adjust the over-power protection value to a first value; when the output voltage is at a second level less than the first level, the over-power protection circuit is configured to turn off the switch according to the output voltage with the second level to provide a second resistance value of the second resistor, so as to adjust the over-power protection value to a second value.

In order to solve the above-mentioned problems, the present disclosure provides an adjustment method for an over-power protection value. The adjustment method for the over-power protection value is applied to a power supply unit including a power switch and a controller, the controller is configured to set an over-power protection value according to a voltage. The adjustment method for the over-power protection value includes steps of: (a) turning on a switch connected in series with the power switch according to an output voltage at a first level of the power supply unit; (b) providing a first resistance value according to the switch being turned on, so as to adjust the over-power protection value to a first value according to the voltage in response to the first resistance value; (c) turning off the switch according to the output voltage at a second level; (d) providing a second resistance value according to the switch being turned off, so as to adjust the over-power protection value to a second value according to the voltage in response to the second resistance value. wherein, the first level is greater than the second level, and the first resistance value is less than the second resistance value.

In one embodiment, the main purpose and effect of the present disclosure is that the power supply unit may correspondingly adjust the over-power protection value under different levels of the output voltage to comply with the relevant specifications of the LPS. It is especially suitable for the over-power protection of output with normal operating mode and standby mode.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
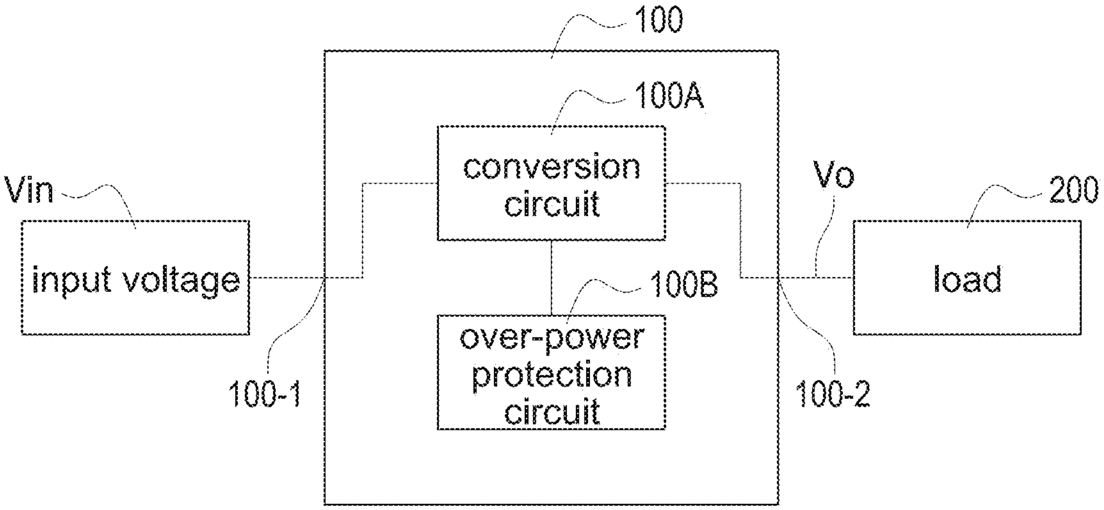
FIG. 1 is a block circuit diagram of a power supply unit with an over-power protection value adjustment function of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power supply unit with an over-power protection value adjustment function of the present disclosure. The power supply unit 100 receives an input voltage Vin from an input end 100-1, and converts the input voltage Vin into an output voltage Vo, so that an output end 100-2 provides the output voltage Vo to power a load 200. The power supply unit 100 includes a conversion circuit 100A and an over-power protection circuit 100B, and the conversion circuit 100A is coupled to the over-power protection circuit 100B. The conversion circuit 100A is used to convert the input voltage Vin into the output voltage Vo, and the over-power protection circuit 100B is used to perform over-power protection on the conversion circuit 100A. Among them, the main purpose and effect of the present disclosure is that the power supply unit 100 may correspondingly adjust the over-power protection value under different levels of the output voltage Vo to comply with the relevant specifications of the LPS (Limited Power Source).

Figure 2:
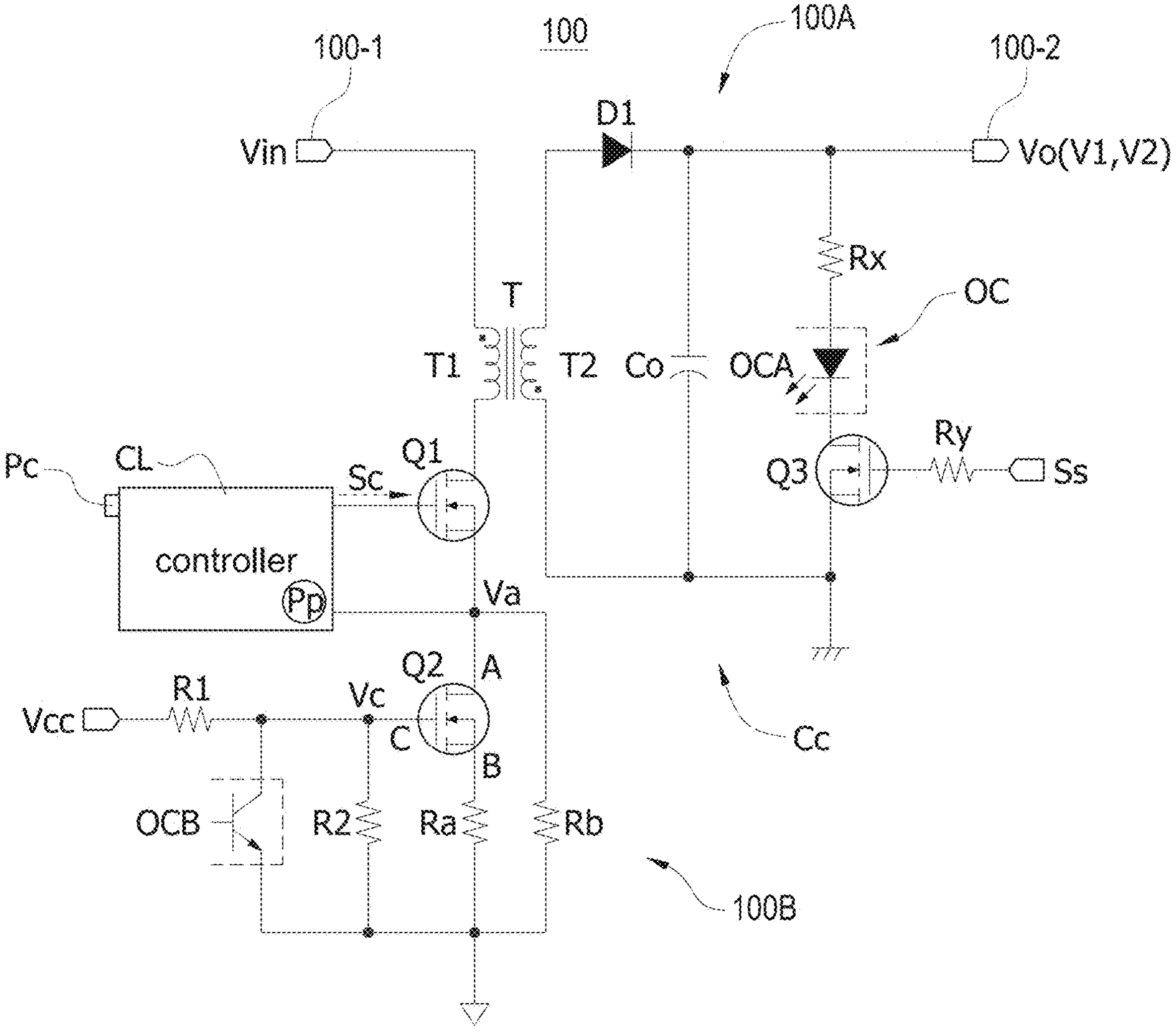
FIG. 2 is a detailed circuit block diagram of the power supply unit with the over-power protection value adjustment function according to a first embodiment of the present disclosure.

Please refer to FIG. 2, which shows a detailed circuit block diagram of the power supply unit with the over-power protection value adjustment function according to a first embodiment of the present disclosure, and also refer to FIG. 1. The conversion circuit 100A includes a power switch Q1, a transformer T, a filter circuit D1, Co and a controller CL, and the transformer T includes a primary side winding T1 and a secondary side winding T2, so as to divide the conversion circuit 100A into a primary side and a secondary side. The power switch Q1 and the input end 100-1 are configured on the primary side and coupled to the primary side winding T1. The filter circuit D1, Co and the output end 100-2 are configured on the secondary side and coupled to the secondary side winding T2. The controller CL is coupled to the power switch Q1, and controls the conversion circuit 100A to convert the input voltage Vin into the output voltage Vo by providing a control signal Sc to control the turning on/off of the power switch Q1. Among them, the control signal Sc may be a PWM (Pulse Width Modulation) signal. The controller CL may be, for example but not be limited to, adjust the pulse width through feedback of the output voltage Vo, thereby controlling and stabilizing a voltage level of the output voltage Vo.

On the other hand, in FIG. 2, The input voltage Vin received by the conversion circuit 100A may be a DC voltage, and the DC input voltage Vin is converted into a DC output voltage Vo, but is not limited thereto. The conversion circuit 100A may be additionally configured with a bridge circuit at the input end 100-1 to convert an AC input voltage Vin into the DC output voltage Vo. In addition, the conversion circuit 100A in FIG. 2 uses a circuit structure of a flyback converter as a schematic example, but is not limited thereto. An applicable types of the conversion circuit 100A will be further described below.

The over-power protection circuit 100B includes a switch Q2, a first resistor Ra and a second resistor Rb, and the switch Q2 includes a first end A, a second end B and a control end C. The first end A is coupled to the power switch Q1 of the conversion circuit 100A and the controller CL, and the controller CL sets the over-power protection value Pp of the power supply unit 100 according to a voltage Va of the first end A. One end of the first resistor Ra is coupled to the second end B, and the other end of the first resistor Ra is coupled to the ground end. One end of the second resistor Rb is coupled to the first end A, and the other end of the second resistor Rb is coupled to the other end of the first resistor Ra and the ground end. Therefore, when a control voltage Vc of the control end C controls the switch Q2 to be turned off, the over-power protection circuit 100B may provide a larger resistance value, and when the control voltage Vc of the control end C controls the switch Q2 to be turned on, the over-power protection circuit 100B may provide a smaller resistance value.

Furthermore, when the power supply unit 100 has different operating modes such as a normal operating mode and a standby mode, the controller CL may adjust the voltage level of the output voltage Vo according to the different modes. Taking the power supply unit 100 including the normal operating mode and the standby mode as an example, when the power supply unit 100 operates in the normal operating mode, the output voltage Vo is at a first level V1 (for example, but not limited to, 24V). When the power supply unit 100 operates in the standby mode, the output voltage Vo is at a second level V2 (for example, but not limited to, 5V). In general, the output voltage Vo in the standby mode will be smaller than the output voltage Vo in the normal operating mode, which means that the second level V2 will generally be smaller than the first level V1. When the output voltage Vo is at the first level V1, the over-power protection circuit 100B turns on the switch Q2 according to the output voltage Vo at the first level V1. When the switch Q2 is turned on, the first resistor Ra and the second resistor Rb are connected in parallel to provide a first resistance value. Therefore, when the power switch Q1 is turned on, a current I flows from the primary side winding T1 through the first resistor Ra and the second resistor Rb, so that a voltage Va generated at the first end A is formed by the current I and the first resistance value. So that, the controller CL may correspondingly adjust the over-power protection value Pp to a first value according to the voltage Va of the first end A.

On the contrary, when the output voltage Vo is at the second level V2, the over-power protection circuit 100B turns off the switch Q2 according to the output voltage Vo at the second level V2. When the switch Q2 is turned off, the first resistor Ra and the first end A are open circuit to provide a second resistance value of the second resistor Rb. Therefore, when the power switch Q1 is turned on, a current I flows from the primary side winding T1 through the second resistor Rb, so that the voltage Va generated at the first end A is formed by the current I and the second resistance value. So that, the controller CL may correspondingly adjust the over-power protection value Pp to a second value according to the voltage Va of the first end A.

Then, according to the over-power protection value Pp being the first value or the second value, the controller CL uses a current detection pin Pc of the controller CL to detect a current at a specific point of the conversion circuit 100A, so as to detect and determine an output power. Among them, the current detection pin Pc may be connected to any current detection point of the conversion circuit 100A through various current detection circuits and current sensors (For example, but not limited to, position of the output end 100-2 or the power switch Q1, etc. in the prior art). Then, calculate the current output power of the conversion circuit 100A through the current and voltage, and compare the current output power with the over-power protection value Pp to determine whether to perform protection. Among them, the over-power protection circuit 100B controls the switch Q2 to be turned on/off and adjusts the resistance value according to the voltage level of the output voltage Vo, which may include a variety of implementations, which will be further described below.

In the embodiment of FIG. 2, the over-power protection circuit 100B further includes a control circuit Cc. The control circuit Cc is coupled to the output end 100-2 and the control end C of the switch Q2, and the control circuit Cc receives a detection signal Ss externally. The detection signal Ss is mainly used to indicate that the power supply unit 100 is operating in the normal operating mode or the standby mode (take the above situation as an example). When the detection signal Ss indicates that the power supply unit 100 is operating in the normal operating mode, it represents that the output voltage Vo is at the first level V1. Therefore, the control circuit Cc controls the switch Q2 to be turned on and the first resistor Ra and the second resistor Rb are connected in parallel to provide the first resistance value. On the contrary, when the detection signal Ss indicates that the power supply unit 100 is operating in the standby mode, it represents that the output voltage Vo is at the second level V2. Therefore, the control circuit Cc controls the switch Q2 to be turned off to provide the second resistance value of the second resistor Rb. Among them, the detection signal Ss may be provided by the load 200, or the detection signal Ss may also be provided by a device such as the controller CL inside the power supply unit 100 after determining the operating mode.

Furthermore, one implementation of the control circuit Cc is that the control circuit Cc includes an optical coupler OC and a detection switch Q3. The optical coupler OC is coupled to the output end 100-2 and the control end C of the switch Q2. Among them, the optical coupler OC includes a transmitting end OCA and a receiving end OCB. The transmitting end OCA is coupled to the output end 100-2, and the receiving end OCB is coupled to the control end C of the switch Q2. The detection switch Q3 is coupled to the transmitting end OCA of the optical coupler OC, and the control end of the detection switch Q3 receives the detection signal Ss. In one embodiment, the switch Q2 and the detection switch Q3 preferably use MOSFETs (metal oxide semi-field effect transistors), but are not limited thereto. All electronic components that may implement the above-mentioned turning on/off control according to a signal level should be included in the scope of this embodiment.

Specifically, when the detection signal Ss corresponds to the output voltage Vo of the first level V1 (here, take the detection signal Ss as a low level as an example), the control end of the detection switch Q3 receives the detection signal Ss as the low level, so that the detection switch Q3 is turned off. The optical coupler OC disconnects the coupling relationship between the control end C and the ground end through the detection switch Q3 being turned off, so that the control end C receives the control voltage Vc and causes the switch Q2 to be turned on. On the contrary, when the detection signal Ss corresponds to the output voltage Vo of the second level V2 (here, take the detection signal Ss as a high level as an example), the control end of the detection switch Q3 receives the detection signal Ss as the high level, so that the detection switch Q3 is turned on. At this time, the transmitting end OCA of the optical coupler OC emits a light source because current flows through it, and the receiving end OCB of the optical coupler OC receives the light source emitted by the transmitting end OCA and causes the receiving end OCB to be turned on. Therefore, the control end C is coupled to the ground end through the receiving end OCB being turned on.

On the other hand, the control circuit Cc may also optionally include a voltage dividing circuit, and the voltage dividing circuit includes a first voltage dividing resistor R1 and a second voltage dividing resistor R2. One end of the first voltage dividing resistor R1 receives a working voltage Vcc, and the other end of the first voltage dividing resistor R1 is coupled to the receiving end OCB of the optical coupler OC and the control end C. One end of the second voltage dividing resistor R2 is coupled to the other end of the first voltage dividing resistor R1, and the other end of the second voltage dividing resistor R2 is coupled to the ground end. Therefore, when the optical coupler OC disconnects the coupling relationship between the control end C and the ground end, the voltage dividing circuit divides the working voltage Vcc through the first voltage dividing resistor R1 and the second voltage dividing resistor R2, so as to establish the control voltage Vc at the control end C that meets a voltage withstand specification of the switch Q2 and turn on the switch Q2. On the contrary, when the receiving end OCB of the optical coupler OC receives the light source emitted by the transmitting end OCA and causes the receiving end OCB to be turned on, the control end C is coupled to the ground end through the receiving end OCB being turned on, so that the voltage received by the control end C is lower than a threshold voltage of the switch Q2 and cannot be turned on.

In addition, the control circuit Cc may also include current limiting resistors (Rx, Ry). The current limiting resistor Rx couples the output end 100-2 and the transmitting end OCA, mainly to avoid excessive power loss caused by excessive current flowing through this path, and even causing the overcurrent damage to electronic components on this path. The current limiting resistor Ry is coupled to the detection switch Q3, and its function is similar to the current limiting resistor Rx, and they will not be repeated here for brevity. In one embodiment, when a voltage value of the working voltage Vcc meets the voltage withstand specification of the switch Q2, there is no need to configure the voltage dividing circuit, and the working voltage Vcc may be used as the control voltage Vc. In addition, in another embodiment, a source of the working voltage Vcc is not limited. It may be a voltage at any point of the power supply unit 100 as a power source, or it may be powered by an external source. Therefore, in summary, the over-power protection circuit 100B may be configured not only in converters with isolation transformers. As long as the controller CL of the power supply unit 100 uses the voltage provided by the resistor to set the over-power protection value, the over-power protection circuit 100B may be used to adjust the over-power protection value accordingly according to different levels of the output voltage Vo.

Figure 3A:
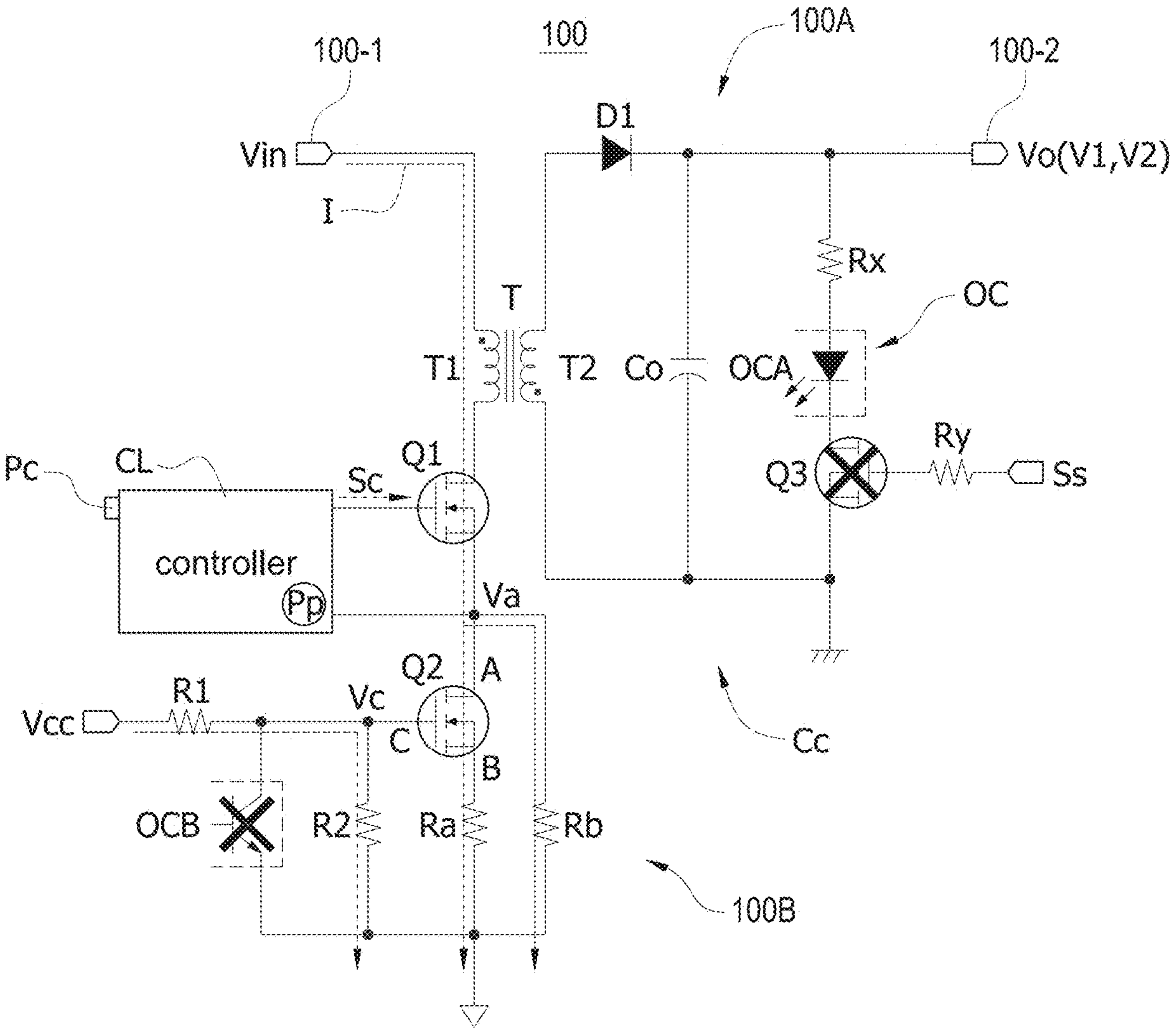
FIG. 3A is a current path diagram when an output voltage of the power supply unit is at a first level according to the first embodiment of the present disclosure.
Figure 3B:
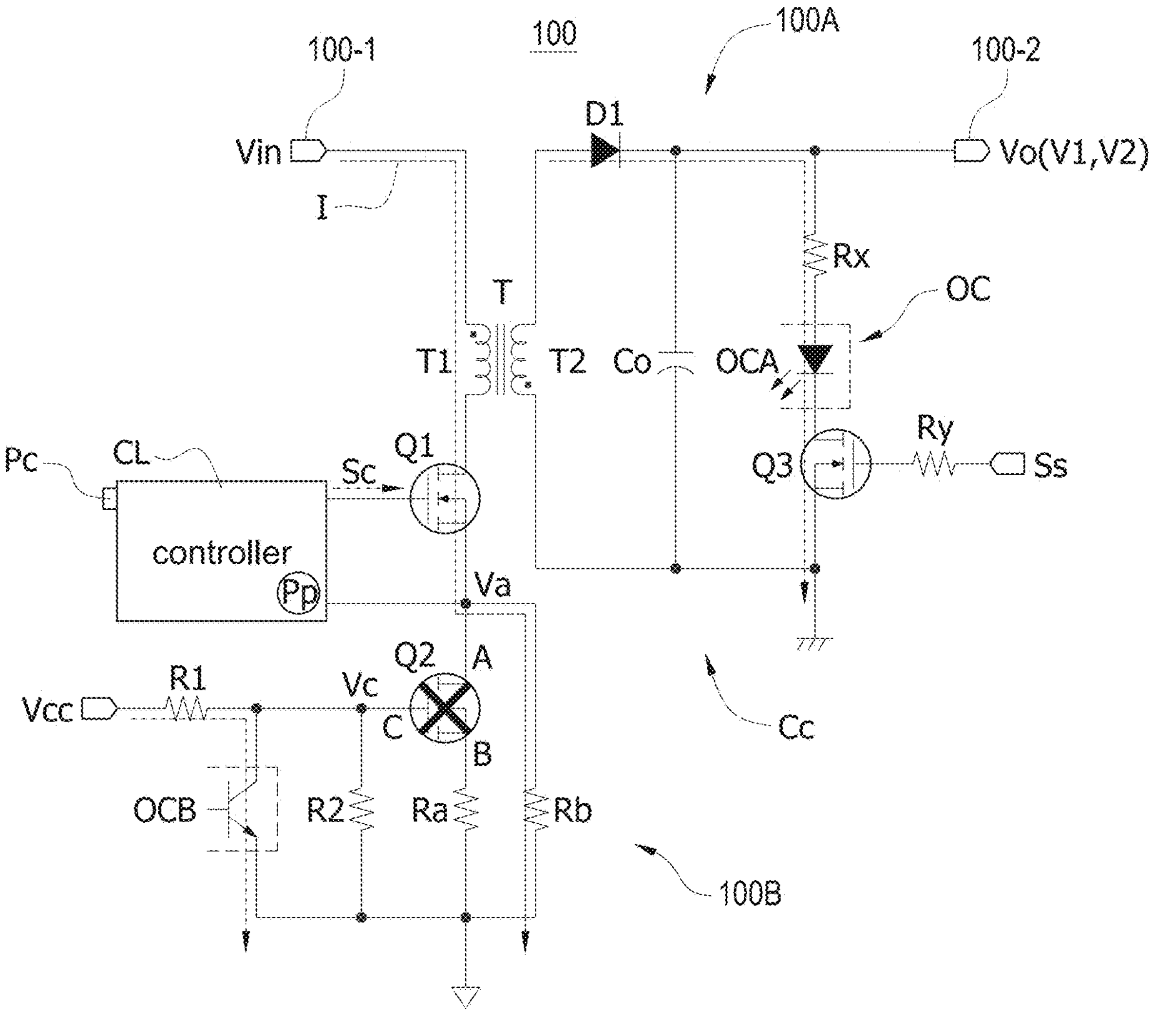
FIG. 3B is a current path diagram when the output voltage of the power supply unit is at a second level according to the first embodiment of the present disclosure.

Please refer to FIG. 3A, which shows a current path diagram when an output voltage of the power supply unit is at a first level according to the first embodiment of the present disclosure, FIG. 3B, which shows a current path diagram when the output voltage of the power supply unit is at a second level according to the first embodiment of the present disclosure, and also refer to FIGS. 1 to 2. Taking FIGS. 3A and 3B as an example, they respectively correspond to the normal operating mode and the standby mode of the power supply unit 100, and the output voltages of the normal operating mode and the standby mode are 24V and 5V respectively as a schematic example. As shown in FIG. 3A, when the load 200 (or the entire system) enters the normal operating mode, the output voltage Vo is at the first level V1 (for example, but not limited to, 24V). The control end of the detection switch Q3 receives the detection signal Ss as the low level, causing a voltage Vgs on gate-source of the detection switch Q3 to be lower than its threshold voltage Vth, causing the detection switch Q3 to be turned off. At this time, no current flows through the diode end of the optical coupler OC (i.e., the transmitting end OCA). The working voltage Vcc received by the primary side provides the voltage Vgs on gate-source (i.e., the control voltage Vc) of the switch Q2 through the first voltage dividing resistor R1 and the second voltage dividing resistor R2. Since the voltage Vgs on gate-source (i.e., the control voltage Vc) of the switch Q2 is greater than its threshold voltage Vth, so that the switch Q2 is turned on and the first resistor Ra and the second resistor Rb are connected in parallel, and their parallel equivalent resistance is the first resistance value. When the power switch Q1 is turned on and the current I flows through the first resistor Ra and the second resistor Rb, the voltage Va is generated and provided to the controller CL. After the controller CL calculates the over-power protection value Pp corresponding to the output voltage Vo of the first level V1 based on the voltage Va, the output power is detected through the current detection pin Pc of the controller CL. Among them, the current I is affected by inductive components such as the primary side winding T1. It is generally a continuous triangular waveform, and its value changes back and forth. Therefore, preferably, the controller CL may usually set the over-power protection value Pp according to a specific value of the current I (such as a peak value or an average value).

As shown in FIG. 3B, when the load 200 (or the entire system) enters the standby mode, the output voltage Vo is at the second level V2 (for example, but not limited to, 5V). The control end of the detection switch Q3 receives the detection signal Ss as the high level, causing the voltage Vgs on gate-source of the detection switch Q3 to be higher than its threshold voltage Vth, causing the detection switch Q3 to be turned on. At this time, the diode end of the optical coupler OC (i.e., the transmitting end OCA) emits light source when current flows through it, and the receiving end OCB of the optical coupler OC receives the light source emitted by the transmitting end OCA and causes the receiving end OCB to be turned on. The working voltage Vcc received by the primary side reduces the voltage Vgs on gate-source of the switch Q2 to less than its threshold voltage Vth through the first voltage dividing resistor R1 and the transistor end of the optocoupler OC (i.e., the receiving end OCB), so that the switch Q2 is turned off, and the resistance value of the second resistor Rb is used as the second resistance value. At this time, when the power switch Q1 is turned on and the current I flows through the second resistor Rb, the voltage Va is generated and provided to the controller CL. After the controller CL calculates the over-power protection value Pp corresponding to the output voltage Vo of the second level V2 based on the voltage Va, the output power is detected through the current detection pin Pc of the controller CL.

Therefore, If the power supply unit 100 operates in the normal operating mode, and when the over-power protection value Pp is 96 W calculated by the controller CL, the maximum output current will be limited to 4 A, and when the output current exceeds 4 A, the power supply unit 100 will perform over-power protection accordingly. On the contrary, if the power supply unit 100 operates in the standby mode, and when the over-power protection value Pp is 20 W calculated by the controller CL, the maximum output current will also be limited to 4 A, and when the output current exceeds 4 A, the power supply unit 100 will also perform over-power protection accordingly. Therefore, unlike prior art, the output current needs to be as high as 19.2 A to trigger over-power protection.

Furthermore, under normal operation, when the power supply unit 100 operates in the normal operating mode, the first resistance value of the first resistor Ra and the second resistor Rb connected in parallel is small (for example but not limited to 3 ohms), but the current I is large (for example but not limited to 4 A). On the contrary, when the power supply unit 100 operates in the standby mode, the first resistance value is larger (for example but not limited to 6 ohms), but the current I is smaller (for example but not limited to 2 A). Therefore, the voltage Va obtained by multiplying the two may be equal or substantially the same (12V) under certain conditions, and different over-power protection values Pp may be obtained after calculation by the controller CL (for example, by detecting the current and voltage of other points, etc.).

Figure 4:
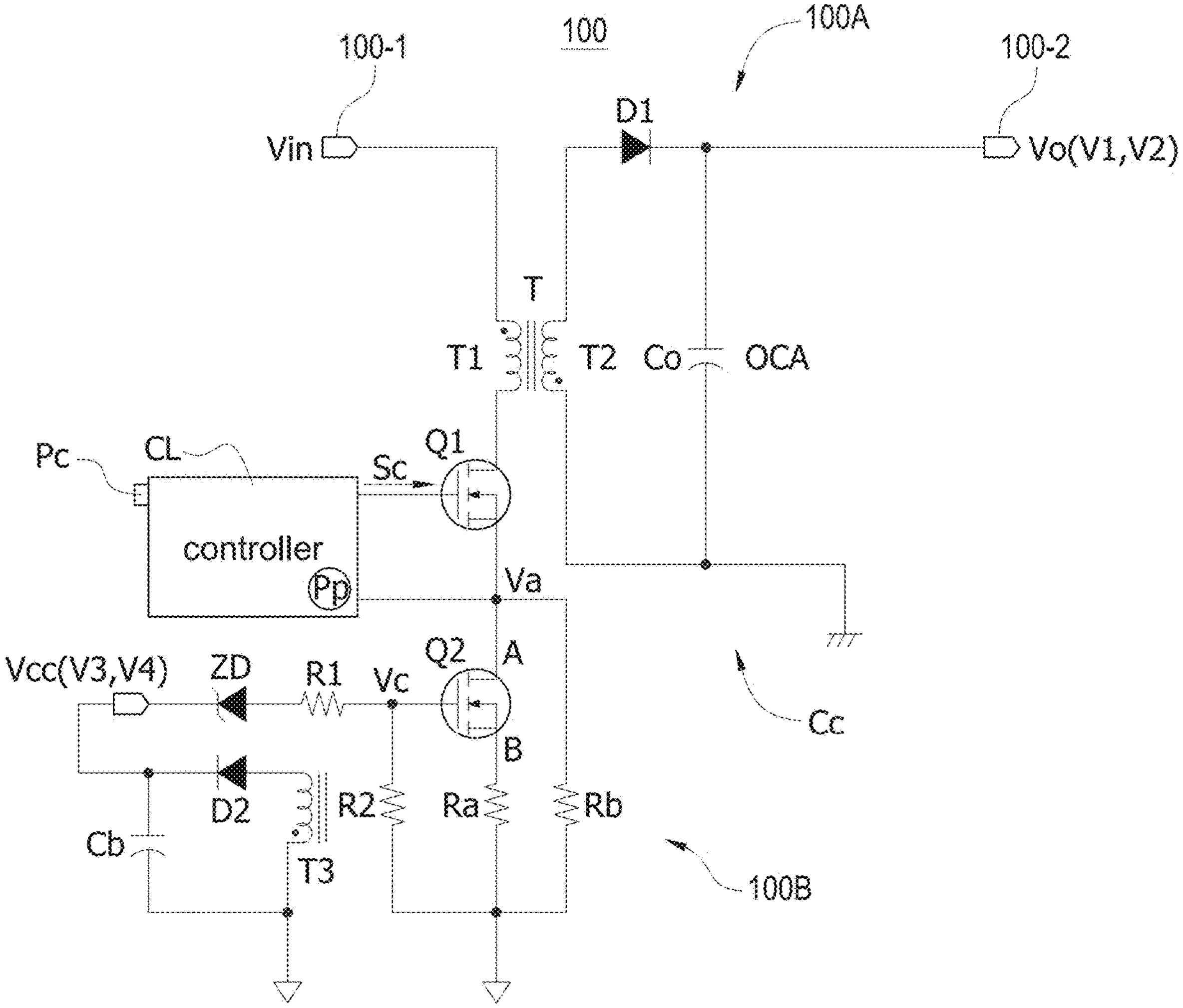
FIG. 4 is a detailed circuit block diagram of the power supply unit with the over-power protection value adjustment function according to a second embodiment of the present disclosure.

Please refer to FIG. 4, which shows a detailed circuit block diagram of the power supply unit with the over-power protection value adjustment function according to a second embodiment of the present disclosure, and also refer to FIGS. 1 to 3B. The difference between the power supply unit 100 in FIG. 4 and FIG. 2 is that the power supply unit 100 includes an auxiliary power circuit, and the auxiliary power circuit includes an auxiliary winding T3, a diode D2, and an energy storage capacitor Cb. In addition, the over-power protection circuit 100B includes a regulator circuit ZD. The power supply unit 100 of FIG. 2 may also include an auxiliary power circuit, but it is not a necessary circuit for adjusting the over-power protection value. The auxiliary winding T3 is coupled to the transformer T to receive an energy provided by the transformer T. The energy obtained by the auxiliary winding T3 is rectified by the diode D2 and stored in the energy storage capacitor Cb, and the working voltage Vcc is generated in the energy storage capacitor Cb. The regulator circuit ZD is coupled to the control end C of the switch Q2 and receives the working voltage Vcc to control the switch Q2 to be turned on/off.

Specifically, when the output voltage Vo is at the first level V1 (for example but not limited to 24V), the working voltage Vcc provided by the auxiliary power circuit is at a third level V3 (for example but not limited to 50V) corresponding to the first level V1, and the regulator circuit ZD establishes the control voltage Vc at the control end C according to the working voltage Vcc of the third level V3 being higher than a clamping voltage (for example but not limited to 30V) of the regulator circuit ZD. On the contrary, when the output voltage Vo is at the second level V2 (for example but not limited to 5V), the working voltage Vcc provided by the auxiliary power circuit is at a fourth level V4 (for example but not limited to 10V) corresponding to the second level V2, and the regulator circuit ZD limits the voltage of the control end C to be lower than the threshold voltage Vth of the switch Q2 according to the working voltage Vcc of the fourth level V4 being lower than the clamping voltage (for example but not limited to 30V).

Among them, the regulator circuit ZD may preferably be a Zener diode, but it is not limited to this. Any circuit that may adjust the voltage of the control end C to control the switch Q2 to be turned on/off based on different working voltages Vcc should be included in the scope of this implementation. Taking the Zener diode as an example, when the working voltage Vcc is higher than a breakdown voltage of the Zener diode (i.e. the clamping voltage, for example but not limited to 30V), a voltage difference of 30V is established between the two ends of the Zener diode, and the sum of the working voltage Vcc and the breakdown voltage (i.e. the clamping voltage) may establish the control voltage Vc (for example but not limited to 20V) at the control end C that may turn on the switch Q2. On the contrary, when the working voltage Vcc is not higher than the breakdown voltage of the Zener diode, the Zener diode is turned off due to a reverse-biased condition to limit the voltage of the control end C to be lower than the threshold voltage Vth of the switch Q2.

On the other hand, in FIG. 4, the voltage dividing circuit may also optionally be included, and the voltage dividing circuit includes the first voltage dividing resistor R1 and the second voltage dividing resistor R2. One end of the first voltage dividing resistor R1 is coupled to the regulator circuit ZD, and the other end of the first voltage dividing resistor R1 is coupled to the control end C. One end of the second voltage dividing resistor R2 is coupled to the other end of the first voltage dividing resistor R1, and the other end of the second voltage dividing resistor R2 is coupled to the ground end. Therefore, when the working voltage Vcc is higher than the clamping voltage, an operating voltage will be established at one end of the first voltage dividing resistor R1, and the operating voltage is the sum of the working voltage Vcc of the third level V3 and the clamping voltage. The voltage dividing circuit divides the operating voltage through the first voltage dividing resistor R1 and the second voltage dividing resistor R2 to establish the control voltage Vc at the control end C to turn on the switch Q2. Taking the Zener diode as an example, the sum of the working voltage Vcc of 50V and the collapse voltage of 30V (i.e. clamping voltage) is 20V, and after 20V is divided by the voltage dividing circuit, the control voltage Vc that meets the voltage withstand specification of switch Q2 is established at the control end C to turn on switch Q2. In one embodiment, the circuit components, connection relationships and operation methods not illustrated in FIG. 4 are all similar to those in FIG. 2 and they will not be repeated here.

Figure 5A:
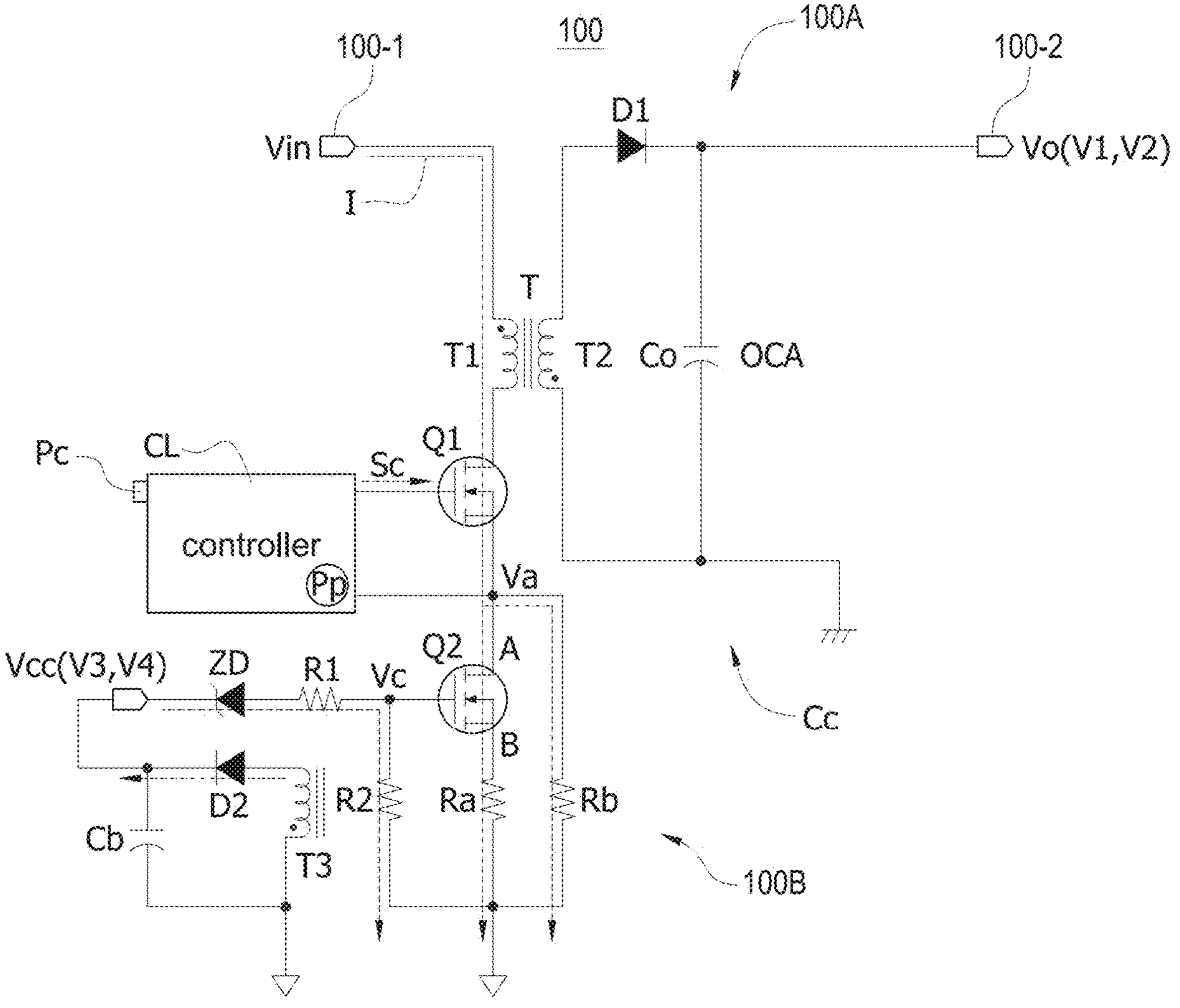
FIG. 5A is a current path diagram when the output voltage of the power supply unit is at the first level according to the second embodiment of the present disclosure.
Figure 5B:
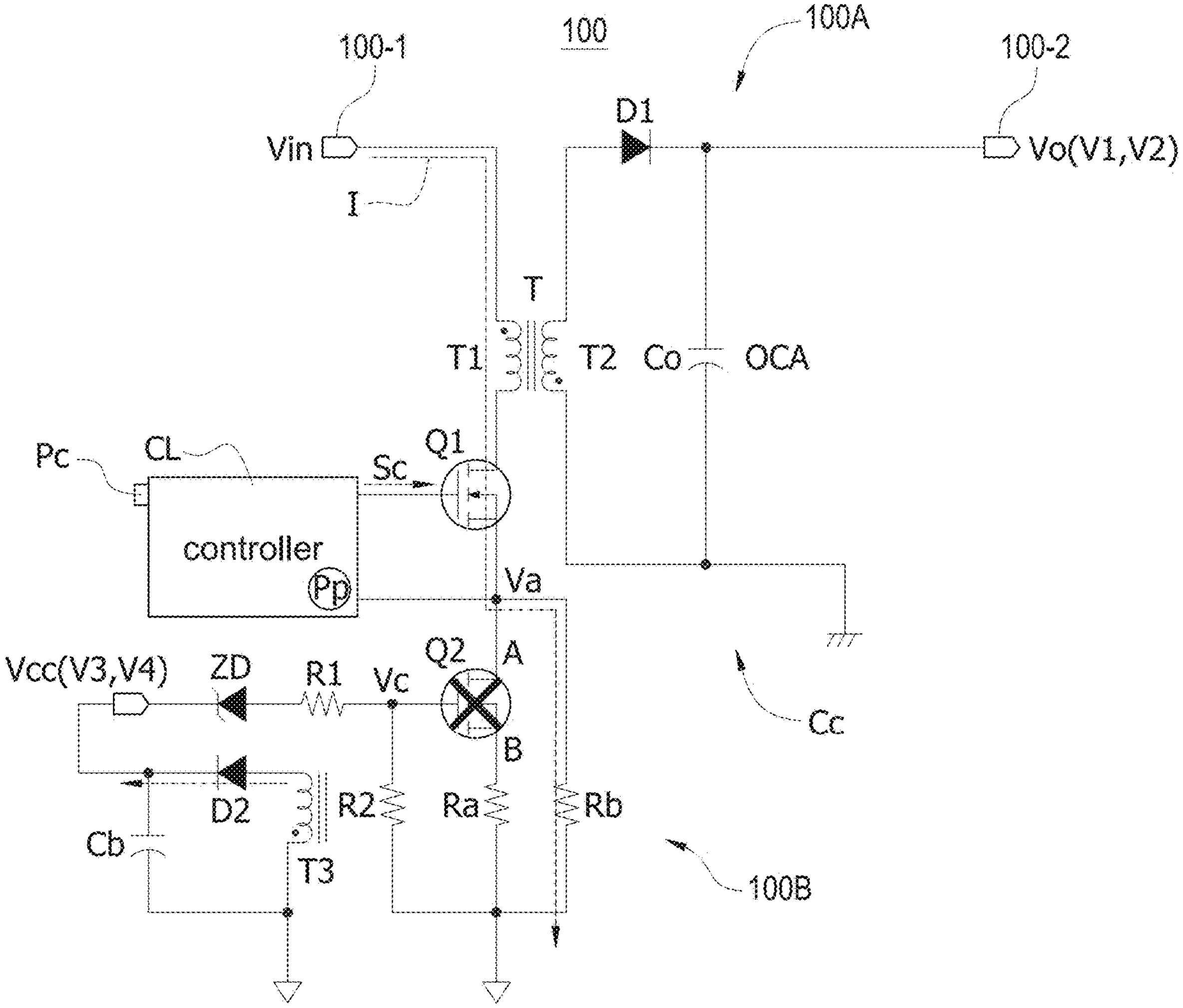
FIG. 5B is a current path diagram when the output voltage of the power supply unit is at the second level according to the second embodiment of the present disclosure.

Please refer to FIG. 5A, which shows a current path diagram when the output voltage of the power supply unit is at the first level according to the second embodiment of the present disclosure, FIG. 5B, which shows a current path diagram when the output voltage of the power supply unit is at the second level according to the second embodiment of the present disclosure, and also refer to FIGS. 1 to 4. Taking FIGS. 5A and 5B as an example, they respectively correspond to the normal operating mode and the standby mode of the power supply unit 100, and the output voltages of the normal operating mode and the standby mode are 24V and 5V respectively as a schematic example. In addition, the regulator circuit ZD also takes the Zener diode as an example. As shown in FIG. 5A, when the load 200 (or the entire system) enters the normal operating mode, the output voltage Vo is at the first level V1 (for example, but not limited to 24V). At this time, the auxiliary power circuit generates the working voltage Vcc of the third level V3 that is higher (for example but not limited to 50V) due to coupling with the transformer T. Since the working voltage Vcc is higher than the clamping voltage (for example but not limited to 30V) of the regulator circuit ZD, the regulator circuit ZD clamps the working voltage Vcc to the operating voltage (20V) to provide the voltage Vgs on gate-source of the switch Q2 (i.e. the control voltage Vc) through the first voltage dividing resistor R1 and the second voltage dividing resistor R2. Since the voltage Vgs on gate-source of the switch Q2 (i.e. the control voltage Vc) is greater than its threshold voltage Vth, so that the switch Q2 is turned on and the first resistor Ra and the second resistor Rb are connected in parallel, and their parallel equivalent resistance is the first resistance value.

As shown in FIG. 5B, when the load 200 (or the entire system) enters the standby mode, the output voltage Vo is at the second level V2 (for example, but not limited to 5V). At this time, the auxiliary power circuit generates the working voltage Vcc of the fourth level V4 that is lower (for example but not limited to 10V) due to coupling with the transformer T. Since the working voltage Vcc is lower than the clamping voltage (for example but not limited to 30V) of the regulator circuit ZD, the regulator circuit ZD is turned off due to a reverse-biased condition, causing the voltage Vgs on gate-source of the switch Q2 to drop to less than its threshold voltage Vth, so that the switch Q2 is turned off and the resistance of the second resistor Rb is used as the second resistance value. In one embodiment, the circuit components, connection relationships and operation methods not illustrated in FIGS. 5A and 5B are all similar to those in FIGS. 3A and 3B, and they will not be repeated here for brevity.

Figure 6:
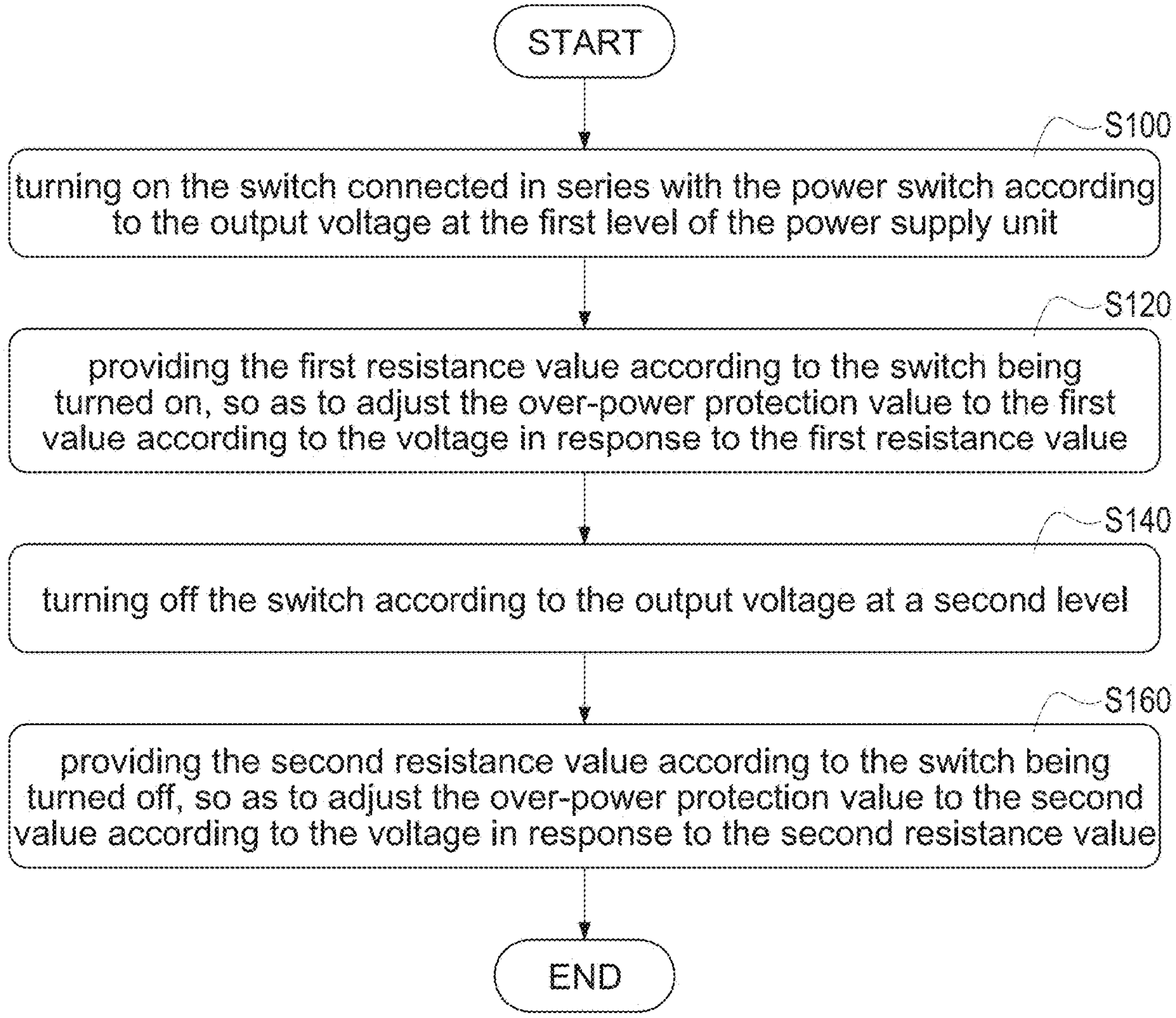
FIG. 6 is a flowchart of an adjustment method for an over-power protection value of the power supply unit according to the present disclosure.

Please refer to FIG. 6, which shows a flowchart of an adjustment method for an over-power protection value of the power supply unit according to the present disclosure, and also refer to FIGS. 1 to 5B. The disclosed that the adjustment method for an over-power protection value is mainly applied to the power supply unit 100 including the power switch Q1 and the controller CL, and the controller CL may set the over-power protection value Pp according to the voltage level of the output voltage Vo of the power supply unit 100. Therefore, the adjustment method for an over-power protection value includes that, turning on the switch connected in series with the power switch according to the output voltage at the first level of the power supply unit (S100). When the power supply unit 100 operates in, for example, but not limited to, the normal operating mode, the output voltage Vo is at the first level V1 (for example but not limited to 24V). When the output voltage Vo is at the first level V1, the over-power protection circuit 100B turns on the switch Q2 according to the output voltage Vo at the first level V1.

Then, providing the first resistance value according to the switch being turned on, so as to adjust the over-power protection value to the first value according to the voltage in response to the first resistance value (S120). A preferred implementation is to use a parallel connection of resistors to provide the first resistance value that is smaller when the switch Q2 is turned on (for example, but not limited to, the first resistor Ra and the second resistor Rb are connected in parallel). Therefore, when the power switch Q1 is turned on, the product of the current I and the first resistance value is the voltage Va, and the controller CL may correspondingly adjust the over-power protection value Pp to the first value according to the voltage Va in response to the first resistance value.

Then, turning off the switch according to the output voltage at a second level (S140). On the contrary, when the power supply unit 100 operates in, for example, but not limited to, the standby mode, the output voltage Vo is at the second level V2 (for example, but not limited to, 5V), and generally speaking, the first level V1 is greater than the second level V2. When the output voltage Vo is at the second level V2, the over-power protection circuit 100B turns off the switch Q2 according to the output voltage Vo at the second level V2. Finally, providing the second resistance value according to the switch being turned off, so as to adjust the over-power protection value to the second value according to the voltage in response to the second resistance value (S160). A preferred implementation is to use a single resistor (for example, but not limited to, the single second resistor Rb) to provide the second resistance value that is larger when the switch Q2 is turned off. Therefore, when the power switch Q1 is turned on, the product of the current I and the second resistance value is the voltage Va, and the controller CL may correspondingly adjust the over-power protection value Pp to the second value according to the voltage Va in response to the second resistance value.

In one embodiment, for detailed steps not described in the above method flow, please refer to FIGS. 2 to 5B and will not be described again here. In addition, in the method steps of FIG. 6, the coupling relationship of each component is not limited. As long as the coupling relationship of the required parameters may be obtained correspondingly according to the actions of each component, it should be included in the scope of this embodiment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply unit configured to provide an output voltage from an output end to supply power to a load, the power supply unit comprising a transformer and an auxiliary power circuit, the auxiliary power circuit coupled to the transformer to provide a working voltage, and the power supply unit further comprising:

an over-power protection circuit, comprising:

a switch comprising a first end and a second end, the first end coupled to a power switch and a controller of the power supply unit, and the controller configured to set an over-power protection value of the power supply unit according to a voltage at the first end;

a first resistor, one end of the first resistor coupled to the second end;

a second resistor, one end of the second resistor coupled to the first end, and the other end of the second resistor coupled to the other end of the first resistor; and a regulator circuit coupled to a control end of the switch, and configured to receive the working voltage, wherein, when the output voltage is at a first level, the over-power protection circuit is configured to turn on the switch according to the output voltage with the first level to provide a first resistance value based on the first resistor and the second resistor in parallel, so as to adjust the over-power protection value to a first value; when the output voltage is at a second level less than the first level, the over-power protection circuit is configured to turn off the switch according to the output voltage with the second level to provide a second resistance value of the second resistor, so as to adjust the over-power protection value to a second value, and wherein, when the output voltage is at the first level, the working voltage provided by the auxiliary power circuit is at a third level corresponding to the first level, and the regulator circuit is configured to establish a control voltage at the control end according to the working voltage of the third level being higher than a clamping voltage of the regulator circuit; when the output voltage is at the second level, the working voltage provided by the auxiliary power circuit is at a fourth level corresponding to the second level, and the regulator circuit is configured to limit the voltage of the control end to be lower than a threshold voltage according to the working voltage of the fourth level being lower than the clamping voltage.

2. The power supply unit as claimed in claim 1, wherein the regulator circuit further comprises:

a voltage dividing circuit comprises:

a first voltage dividing resistor, one end of the first voltage dividing resistor coupled to the regulator circuit, and the other end of the first voltage dividing resistor coupled to the control end; and a second voltage dividing resistor, one end of the second voltage dividing resistor coupled to the other end of the first voltage dividing resistor, and the other end of the second voltage dividing resistor coupled to the ground end;

wherein, the voltage dividing circuit is configured to divide an operating voltage through the first voltage dividing resistor and the second voltage dividing resistor to establish the control voltage at the control end to turn on the switch, and the operating voltage is the sum of the working voltage of the third level and the clamping voltage.

3. The power supply unit as claimed in claim 1, wherein the regulator circuit is a Zener diode, when the working voltage is at the third level, the Zener diode is configured to establish the clamping voltage, and when the working voltage is at the fourth level, the Zener diode is turned off due to a reverse-biased condition.

4. An adjustment method for an over-power protection value, applied to a power supply unit comprising a power switch and a controller, the controller configured to set an over-power protection value according to a voltage, and the adjustment method for the over-power protection value comprising steps of:

turning on a switch connected in series with the power switch according to an output voltage at a first level of the power supply unit;

providing a first resistance value according to the switch being turned on, so as to adjust the over-power protection value to a first value according to the voltage in response to the first resistance value;

turning off the switch according to the output voltage at a second level;

providing a second resistance value according to the switch being turned off, so as to adjust the over-power protection value to a second value according to the voltage in response to the second resistance value;

correspondingly, generating the working voltage of a third level according to the output voltage at the first level;

establishing a control voltage at a control end of the switch according to the working voltage of the third level being higher than a clamping voltage of a regulator circuit;

correspondingly, generating the working voltage of a fourth level according to the output voltage at the second level; and limiting the voltage of the control end to be lower than a threshold voltage according to the working voltage of the fourth level being lower than the clamping voltage, wherein, the first level is greater than the second level, and the first resistance value is less than the second resistance value.

* * * * *